United States Patent
Jung et al.

(10) Patent No.: US 9,113,379 B2
(45) Date of Patent: Aug. 18, 2015

(54) APPARATUS AND METHOD FOR PERFORMING HANDOVER IN A COMMUNICATION SYSTEM

(75) Inventors: Young-Ho Jung, Suwon-si (KR); Yung-Soo Kim, Seongnam-si (KR); Myeon-Kyun Cho, Seongnam-si (KR); Dai-Kwan Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1555 days.

(21) Appl. No.: 12/175,949

(22) Filed: Jul. 18, 2008

(65) Prior Publication Data
US 2009/0042574 A1    Feb. 12, 2009

(30) Foreign Application Priority Data

Aug. 9, 2007 (KR) .................. 10-2007-0080097

(51) Int. Cl.
*H04W 36/00* (2009.01)
*H04W 36/04* (2009.01)

(52) U.S. Cl.
CPC .......... *H04W 36/0061* (2013.01); *H04W 36/04* (2013.01); *Y02B 60/50* (2013.01)

(58) Field of Classification Search
CPC ......... H04W 36/04; H04W 36/0055–36/0077; Y02B 60/50
USPC .................. 370/331–334, 329; 455/436–444
See application file for complete search history.

(56) References Cited

U.S. PATENT DOCUMENTS

| | | | | |
|---|---|---|---|---|
| 5,548,806 A | * | 8/1996 | Yamaguchi et al. | 455/441 |
| 5,983,097 A | * | 11/1999 | Kakinuma et al. | 455/422.1 |
| 7,142,861 B2 | * | 11/2006 | Murai | 455/444 |
| 2003/0050078 A1 | * | 3/2003 | Motegi et al. | 455/456 |
| 2005/0113117 A1 | * | 5/2005 | Bolin et al. | 455/456.6 |
| 2006/0003767 A1 | * | 1/2006 | Kim et al. | 455/436 |
| 2007/0021119 A1 | * | 1/2007 | Lee et al. | 455/436 |
| 2007/0105568 A1 | * | 5/2007 | Nylander et al. | 455/458 |
| 2009/0059861 A1 | * | 3/2009 | Gunnarsson et al. | 370/331 |
| 2012/0106516 A1 | | 5/2012 | Jung et al. | |

FOREIGN PATENT DOCUMENTS

KR    10-2011-0004330 A    1/2011

* cited by examiner

*Primary Examiner* — Pao Sinkantarakorn
*Assistant Examiner* — Richard Chang
(74) *Attorney, Agent, or Firm* — Jefferson IP Law, LLP

(57) ABSTRACT

A handover apparatus and method in a communication system having a macro BS and a plurality of micro BSs in one cell are provided. A handover apparatus includes a macro BS for generating a plurality of messages, each messages respectively corresponds to one of a plurality of group areas defined by grouping service areas of the micro BSs and includes information about BSs to which MSs of the group area can perform handover. The macro BS also generates group area information indicating locations of the group areas, broadcasts the plurality of messages and the group area information to the cell, and manages handover of MSs based on the plurality of messages and the group area information.

18 Claims, 9 Drawing Sheets

APPARATUS AND METHOD FOR PERFORMING HANDOVER IN A COMMUNICATION SYSTEM

PRIORITY

This application claims the benefit under 35 U.S.C. §119 (a) of a Korean patent application filed in the Korean Intellectual Property Office on Aug. 9, 2007 and assigned Serial No. 2007-80097, the entire disclosure of which is hereby incorporated by reference.

BACKGROUND OF THE INVENTION

1. Field of the Invention

The present invention relates to an apparatus and method for performing handover in a communication system. More particularly, the present invention relates to an apparatus and method for performing handover according to a Mobile Neighbor Advertisement (MOB_NBR-ADV) message that a Base Station (BS) broadcasts for the handover.

2. Description of the Related Art

The term "handover" refers to a process of enabling a Mobile Station (MS) to move to a target BS to receive a better service when the quality of a service from a serving BS is degraded. To support the handover, the serving BS periodically broadcasts a MOB_NBR-ADV message including information about neighbor BSs to all MSs within its cell. Using the MOB_NBR-ADV message, the MSs within the service coverage area of the serving BS can obtain status information about BSs within neighbor cells. Therefore, when an MS moves from a serving cell to a neighbor cell, it acquires information about the neighbor BS that the serving BS broadcasts to support handover.

FIG. 1 illustrates a cell configuration in which handover occurs in a conventional communication system.

Referring to FIG. 1, the communication system includes cells 100, 110 and 120 (Cell A, Cell B and Cell C, respectively). First, second and third BSs 101, 111 and 121 (BS1, BS2 and BS3, respectively) manage Cell A, Cell B and Cell C, respectively. BS1 communicates with first and second MSs 103 and 105 (MS1 and MS2, respectively), BS2 communicates with third and fourth MSs 113 and 115 (MS3 and MS4, respectively), and BS3 communicates with fifth and sixth MSs 123 and 125 (MS5 and MS6, respectively).

As illustrated by the dashed line in FIG. 1, MS3 is initially provided service by BS2. If the service from BS2 degrades due to a change in circumstance of MS3, for example due to its movement, a change in propagation environment, an increase in the number of MSs in the serving cell, or any other factor, handover is required for MS3. That is, MS3 needs handover to a target BS that provides a better service than the serving BS, BS2. Thus, MS3 synchronizes itself to neighbor BSs (i.e. BS1 and BS3) indicated by a MOB_NBR-ADV message and scans the neighbor BSs by measuring their channel statuses, based on the MOB_NBR-ADV message and a Mobile Scanning Response (MOB_SCN-RSP) message received from BS2. The scanning is performed sequentially in accordance with a list of the neighbor BSs.

After the scanning, MS3 detects the best BS using the channel status measurements. In FIG. 1, MS3 detects the best BS as BS1 and thus performs handover to BS1.

The MOB_NBR-ADV message, which includes information about all neighbor BSs to which an MS within a cell can perform handover, is broadcast to all MSs within the cell.

However, if more than one BS exists in the cell or BSs operating in different modes co-exist in the same area, the MOB_NBR-ADV message must contain an increased amount of neighbor BS information. The resulting increased message size leads to increased transmission overhead. Moreover, as MSs need to scan more BSs, a longer time is required for the scanning, thereby increasing power consumption for the scanning.

Therefore, a need exists for an improved apparatus and method for performing handover that requires less information for transmission and reduces the amount of power consumed for scanning.

SUMMARY OF THE INVENTION

An aspect of the present invention is to address at least the above-mentioned problems and/or disadvantages and to provide at least the advantages described below. Accordingly, an aspect of the present invention is to provide an apparatus and method for performing handover based on a MOB_NBR-ADV message that a BS broadcasts in a communication system.

Another aspect of the present invention is to provide an apparatus and method for transmitting a plurality of MOB_NBR-ADV messages by a BS, each of the messages including information about a number of neighbor BSs, for selecting a MOB_NBR-ADV message corresponding to the location of an MS and for performing handover based on the MOB_NBR-ADV message selected by the MS in a communication system.

In accordance with an aspect of the present invention, a handover method of a macro BS in a communication system having a plurality of micro BSs in one cell is provided. The macro BS generates messages, each of the messages corresponding to one of a plurality of group areas defined by grouping service coverage areas of the micro BSs and including information about BSs to which MSs of the group area can perform handover, generates group area information indicating locations of the group areas, broadcasts the messages and the group area information to the cell, and manages handover of MSs based on the messages and the group area information.

In accordance with another aspect of the present invention, a handover method of a macro BS in a communication system having a plurality of micro BSs in one cell is provided. In the handover method, the macro BS generates messages, each of the messages corresponding to one of a plurality of group areas defined by grouping service coverage areas of the micro BSs and including information about BSs to which MSs of the group area can perform handover, generates group area information indicating locations of the group areas, broadcasts the messages and the group area information to the cell, generates reference signals for use in estimating the locations of the group areas, and transmits the reference signals to MSs within the group areas.

In accordance with a further aspect of the present invention, a handover method of an MS in a communication system having a macro BS and a plurality of micro BSs in one cell is provided. In the handover method, the MS receives messages and group area information broadcast from the cell, determines a group area to which the MS belongs based on the group area information and location information of the MS, detects a message corresponding to the determined group area from among the broadcast messages, and performs handover based on the detected message.

In accordance with still another aspect of the present invention, a handover method of an MS in a communication system having a macro BS and a plurality of micro BSs in one cell is provided. In the handover method, the MS receives messages broadcast from the cell and reference signals transmitted to MSs within respective group areas, detects at least one reference signal with a highest reception gain from among the received reference signals, detects a group area to which the MS belongs using the detected reference signal, detects a message corresponding to the detected group from among the broadcast messages, and performs handover based on the detected message.

In accordance with still a further aspect of the present invention, a macro Base Station (BS) in a communication system having a plurality of micro BSs in one cell is provided. The macro BS generates messages, each of the messages corresponding to one of group areas defined by grouping service areas of the micro BSs and including information about BSs to which MSs of the group area can perform handover, generates group area information indicating locations of the group areas, broadcasts the messages and the group area information to the cell, and manages handover of MSs based on the messages and the group area information.

In accordance with yet another aspect of the present invention, a macro Base Station (BS) in a communication system having a plurality of micro BSs in one cell is provided. The macro BS generates messages, each of the messages corresponding to one of group area defined by grouping service areas of the micro BSs and including information about BSs to which MSs of the group area can perform handover, generates group area information indicating locations of the group areas, broadcasts the messages and the group area information to the cell, generates reference signals for use in estimating the locations of the group areas, and transmits the reference signals to MSs within the group areas.

In accordance with yet a further aspect of the present invention, a Mobile Station (MS) in a communication system having a macro BS and a plurality of micro BSs in one cell is provided. The MS receives messages and group area information broadcast from the cell, detects a group area to which the MS belongs based on the group area information and location information of the MS, detects a message corresponding to the detected group area from among the broadcast messages, and performs handover based on the detected message.

In accordance with yet still another aspect of the present invention, a Mobile Station (MS) in a communication system having a macro BS and a plurality of micro BSs in one cell is provided. The MS receives messages broadcast from the cell and reference signals transmitted to MSs within respective group areas, detects at least one reference signal with a highest reception gain from among the received reference signals, detects a group area to which the MS belongs using the detected reference signal, detects a message corresponding to the detected group from among the broadcast messages, and performs handover based on the detected message.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide an apparatus and method for performing handover based on a MOB_NBR-ADV message broadcast by a BS in a communication system. More particularly, exemplary embodiments of the present invention provide an apparatus and method for transmitting a plurality of MOB_NBR-ADV messages by a BS, each of them including information about a number of neighbor BSs, for selecting a MOB_NBR-ADV message corresponding to the location of an MS and for performing handover based on the selected MOB_NBR-ADV message by the MS in a communication system.

The following description is made of an exemplary method for selecting and receiving a MOB_NBR-ADV message by an MS according to the location of the MS. The MOB_NBR-ADV message selection and reception will be described separately for a case where the MS can estimate its location and for a case where the MS cannot estimate its location.

Figure 1:
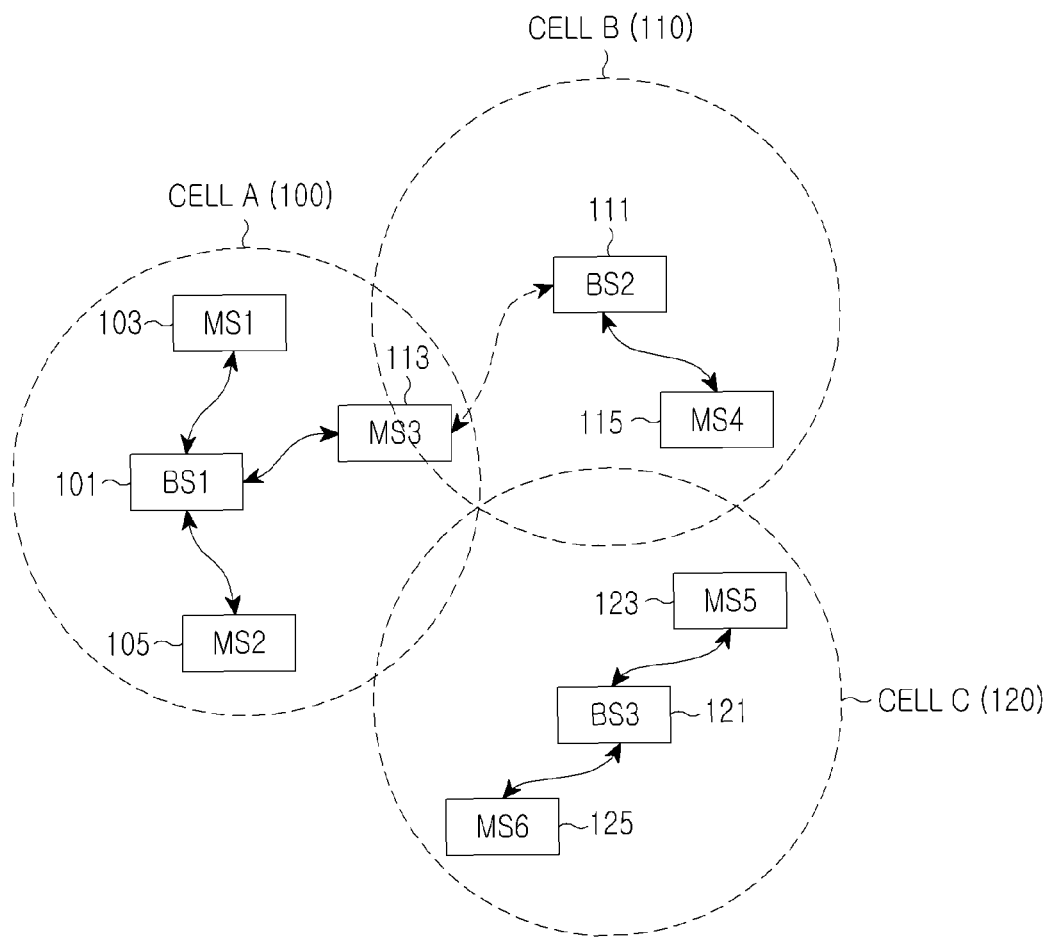
FIG. 1 illustrates a cell configuration in which handover occurs in a conventional communication system.
Figure 2:
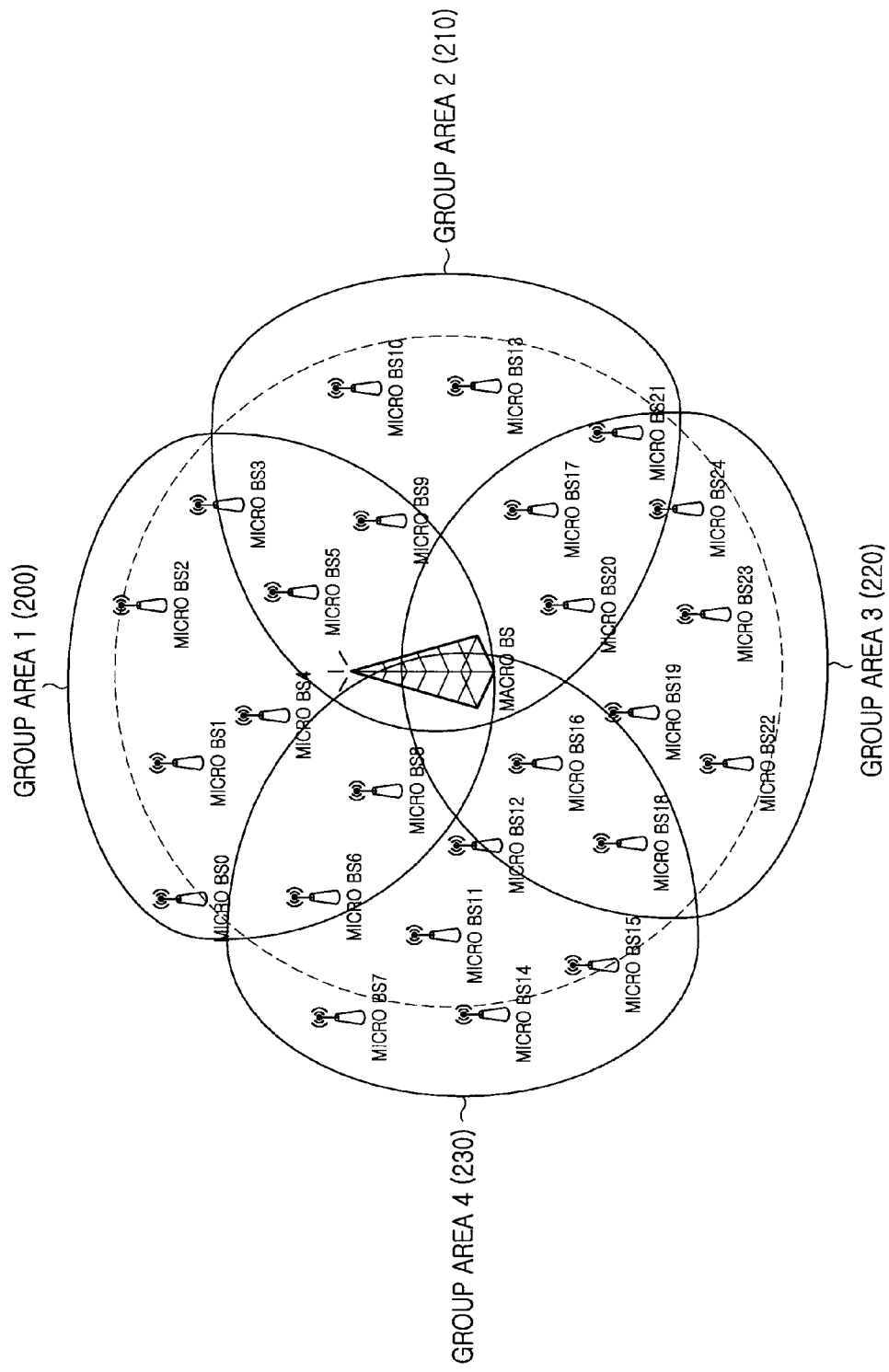
FIG. 2 illustrates an operation of a BS for broadcasting MOB_NBR-ADV messages in a communication system according to an exemplary embodiment of the present invention.

FIG. 2 illustrates an operation of a BS for broadcasting MOB_NBR-ADV messages in a communication system according to an exemplary embodiment of the present invention.

Referring generally to FIG. 2, the communication system includes a macro BS and a plurality of micro BSs within the service coverage area of the macro BS. An operation of configuring MOB_NBR-ADV messages will first be described. The macro BS divides its service coverage area into a plurality of group areas. Based on the divided group areas, the BS configures MOB_NBR-ADV messages to include information about micro BSs within each group area as well as a list of neighbor macro BSs for each group area. As illustrated in FIG. 2, the plurality of group areas are slightly overlapped with one another. Accordingly, the lists of neighbor macro BSs may be different depending on the locations of the group areas.

The MOB_NBR-ADV messages that are generated for the respective group areas are broadcast to all MSs within the service coverage area of the macro BS. For example, in a communication system as illustrated in FIG. 2 having a macro BS and a plurality of micro BSs (i.e. micro BS0 to micro BS24), the service coverage area of the macro BS is divided into first to fourth group areas 200, 210, 220 and 230 (group area 1, group area 2, group area 3, and group area 4, respectively). Then MOB_NBR-ADV messages are created for the respective group areas as follows:

(1) MOB_NBR-ADV 1 (for group area 1): micro BS0, micro BS1, micro BS2, micro BS3, micro BS4, micro BS5, micro BS6, micro BS8, micro BS9 and a neighbor macro BS list (2) MOB_NBR-ADV 2 (for group area 2): micro BS3, micro BS5, micro BS9, micro BS10, micro BS13, micro BS17, micro BS20, micro BS21 and a neighbor macro BS list (3) MOB_NBR-ADV 3 (for group area 3): micro BS16, micro BS17, micro BS18, micro BS19, micro BS20, micro BS21, micro BS22, micro BS23, micro BS24 and a neighbor macro BS list (4) MOB_NBR-ADV 4 (for group area 4): micro BS6, micro BS7, micro BS8, micro BS11, micro BS12, micro BS14, micro BS15, micro BS16, micro BS18 and a neighbor macro BS list That is, the macro BS broadcasts MOB_NBR-ADV 1, MOB_NBR-ADV 2, MOB_NBR-ADV 3, and MOB_NBR-ADV 4 to all MSs within its service area.

In addition to the MOB_NBR-ADV messages, the macro BS may also transmit site information to an MS depending on whether the MS can estimate its location. The macro BS determines that the MS can estimate its location by receiving location information from the MS. In other words, upon receipt of location information from an MS, the macro BS determines that the MS can estimate its location. If the macro BS has not received location information from the MS, it determines that the MS cannot estimate its location.

Therefore, when the macro BS receives the location information from the MS (i.e. when the MS can estimate its location), the macro BS transmits site information to the MS. The site information may include information about the reference coordinates and radiuses of the group areas. The reference coordinates of a group area may be the coordinates of the center of the group area, for example. Moreover, the radius information may be transmitted only if the group areas have different radiuses.

On the other hand, if the macro BS has not received the location information from the MS (i.e. if the MS cannot estimate its location), the macro BS transmits reference signals specific to each group area to the MS and the MS estimates the group areas using the reference signals. The reference signal of a group area may be a beam specific to the group area, for example.

Figure 3:
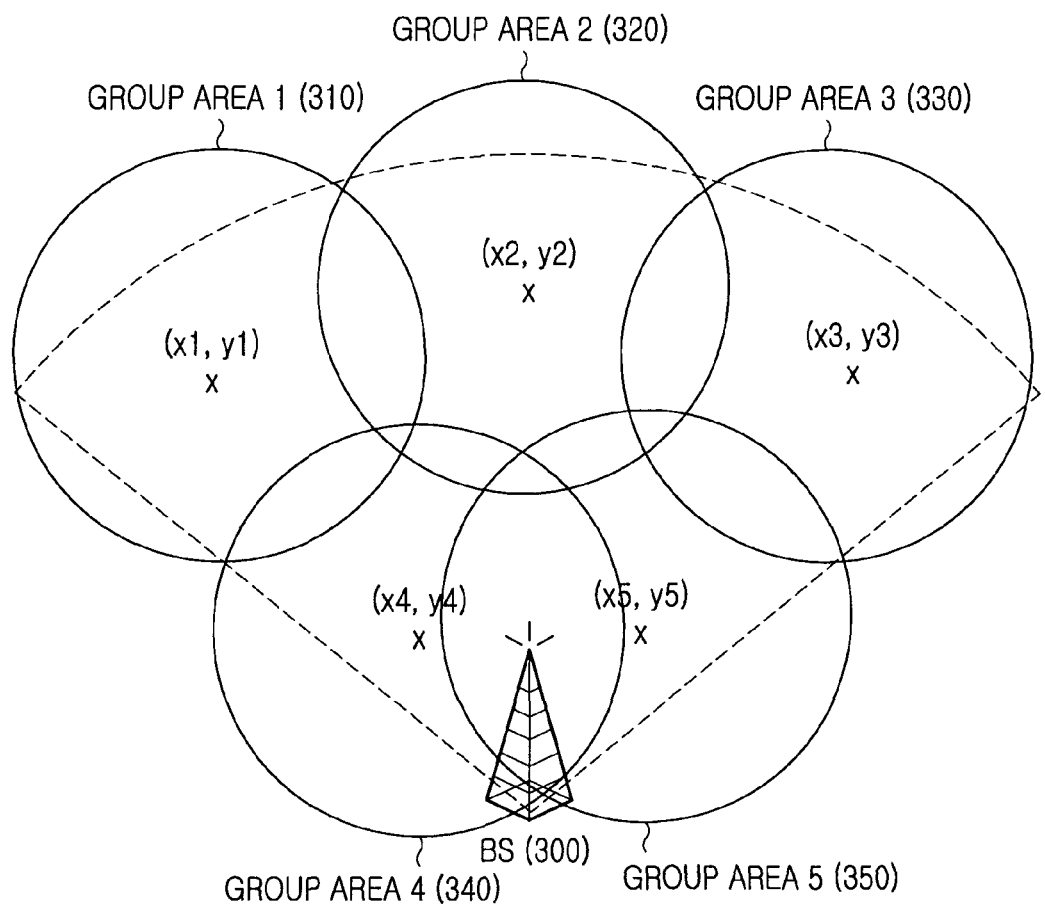
FIG. 3 illustrates an operation of an MS for receiving a MOB_NBR-ADV message, when the MS can estimate its location in a communication system according to an exemplary embodiment of the present invention.

With reference to FIG. 3, a description will be made of an operation of an MS for receiving a MOB_NBR-ADV message corresponding to its group area from the BS, when the MS can estimate its location in the communication system, according to an exemplary embodiment of the present invention. Because the MS can estimate its location, it transmits its location information to the BS. The illustrated embodiment described below is based on the assumption that the service area of the BS is divided into five group areas. It is to be understood that this is by way of example only and is not to be construed as limiting.

FIG. 3 illustrates an operation of an MS for receiving a MOB_NBR-ADV message, when the MS can estimate its location in a communication system according to an exemplary embodiment of the present invention.

Referring to FIG. 3, the MS, which can estimate its location, receives group area information (i.e. the coordinates of the centers of group areas) from a BS 300, detects a group area to which it belongs, and receives a MOB_NBR-ADV message corresponding to the detected group area. More specifically, the MS locates itself and determines a group area in which it is located from among group areas having the same or a greater radius from the received reference coordinates. In other words, if the MS determines that the distance between its current location and a set of reference coordinates is greater than the radius of the group area associated with those reference coordinates, then the MS is not located in that group area.

Figure 4A:
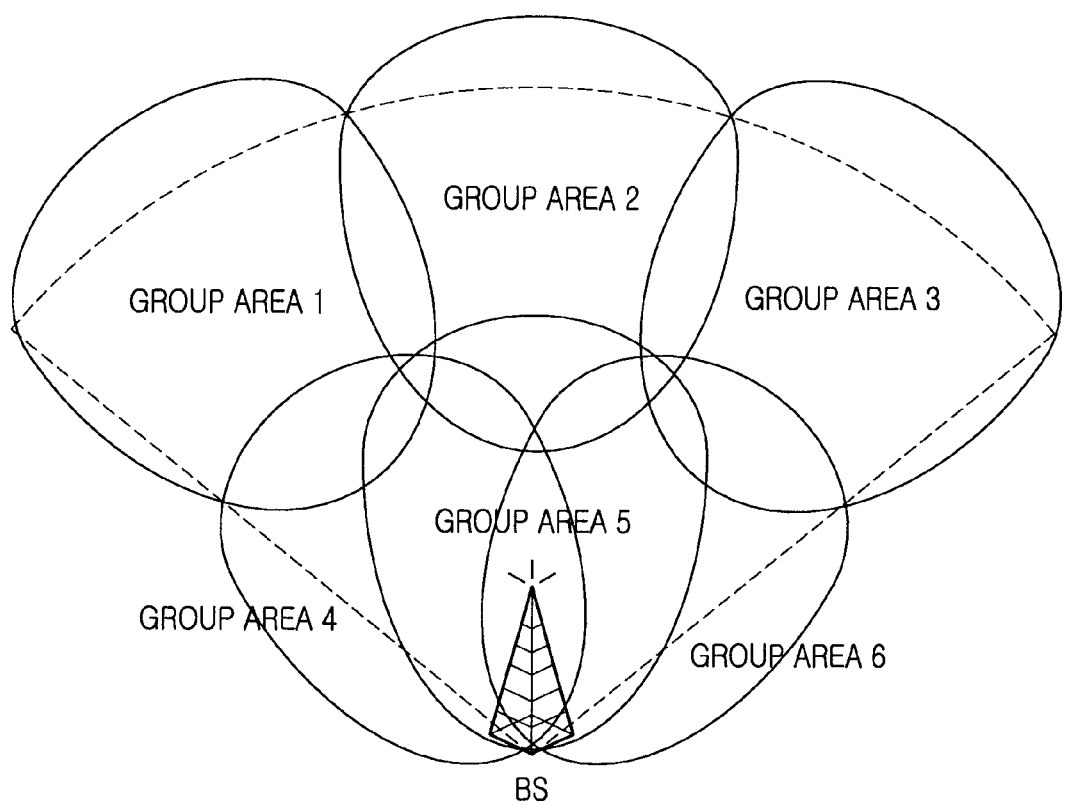
FIG. 4A illustrates a cell configuration in which a cell covered by a BS is divided into six group areas in a communication system according to an exemplary embodiment of the present invention.

In the illustrated embodiment of FIG. 3, since first to fifth group areas 310, 320, 330, 340 and 350 (group area 1 to group area 5, respectively) have the same radius, the MS does not receive information about the radius of each group area. On the contrary, if one or more group areas has a different radius than another group area, the MS receives radius information about the group areas. Thus, the MS determines its own location and determines a group area to which it belongs from among the group areas having the radiuses set in the group area radius information at the reference coordinates. Now with reference to FIGS. 4A, 4B and 4C, a description will be made of an operation of an MS for receiving a MOB_NBR-ADV message corresponding to its group area from the BS, when the MS cannot estimate its location according to an exemplary embodiment of the present invention. The illustrated embodiment will be described in the context of the service area of the BS being divided into six group areas as illustrated in FIG. 4A. It is to be understood that this is by way of example only and is not to be construed as limiting.

FIG. 4A illustrates a configuration in which a cell covered by a BS is divided into six group areas in a communication system according to an exemplary embodiment of the present invention.

Referring to FIG. 4A, the service area of the BS is divided into six group areas that are somewhat overlapped with one another.

Figure 4B:
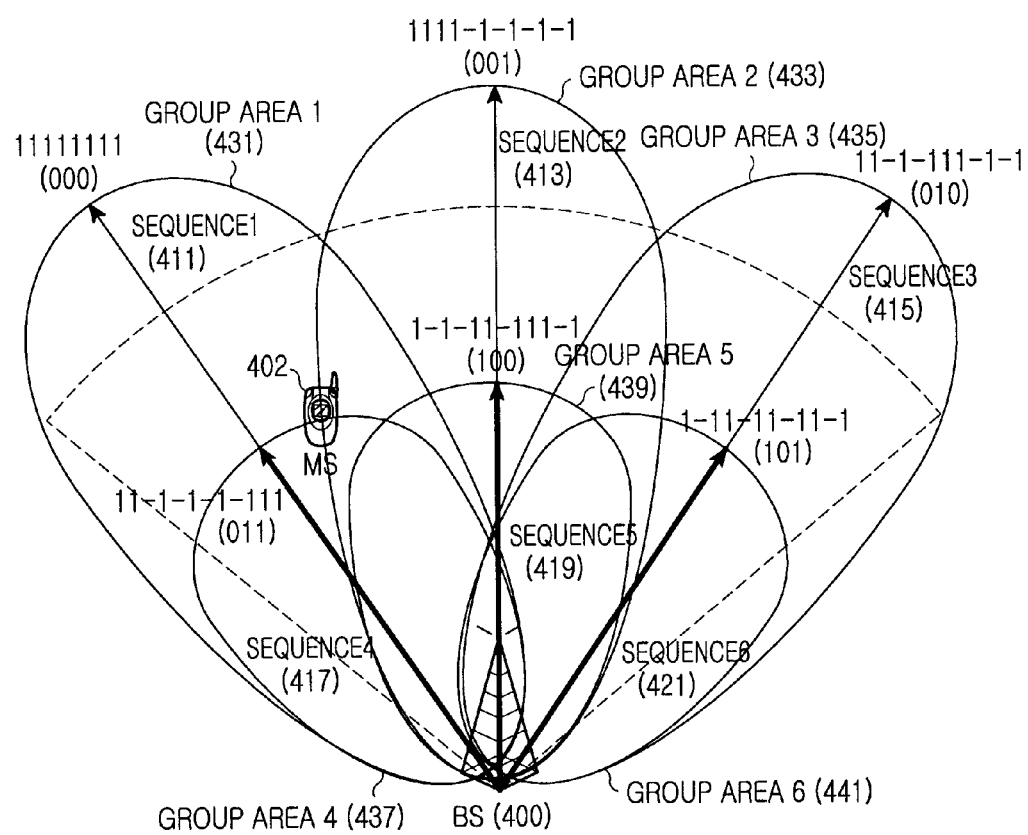
FIG. 4B illustrates an operation of an MS for receiving a MOB_NBR-ADV message by receiving different beams with different power levels from different directions and estimating its location accordingly in a communication system according to an exemplary embodiment of the present invention.

FIG. 4B illustrates an operation of an MS for receiving a MOB_NBR-ADV message by receiving different beams with different power levels from different directions and estimating its location accordingly in a communication system according to an exemplary embodiment of the present invention.

Referring to FIG. 4B, a BS 400 forms beams corresponding to first to sixth group areas 431, 433, 435, 437, 439 and 441 (group area 1 to group area 6) and transmits the beams. The beams are transmitted such that beams steered in the same direction have different transmit power levels in order to distinguish an outer cell area and an inner cell area. Furthermore, the beams are transmitted using orthogonal resources and beams steered in different directions are summed and transmitted using the same resources. The beams transmitted from the BS 400 can be identified by their index messages, for example, 000, 001, 010, 011, 100 and 101.

An MS 402 correlates a received beam using sequences that are mapped to the respective beams. For example, the MS 402 uses first to sixth sequences 411, 413, 415, 417, 419 and 421 (sequence 1 to sequence 6) to correlate the received beam. In the example of FIG. 4B, sequence 1 to sequence 6 are 11111111, 1111-1-1-1-1, 11-1-111-1-1, 11-1-1-1-111, 1-1-11-111-1, and 1-11-11-11-1, respectively. Then the MS 402 detects the sequences providing the highest reception gains. In this case, sequence 1 and sequence 4, as an outer cell area sequence and an inner cell area sequence, respectively, are detected as the sequences providing the highest reception gains. The MS 402 compares the reception gain of the inner cell area sequence, i.e. sequence 4 with a threshold. Because the reception gain of sequence 4 is higher than the threshold, the MS 402 determines that it is located in an inner cell area, i.e. group area 4. Thus, the MS 402 receives a MOB_NBR-ADV message corresponding to group area 4.

Figure 4C:
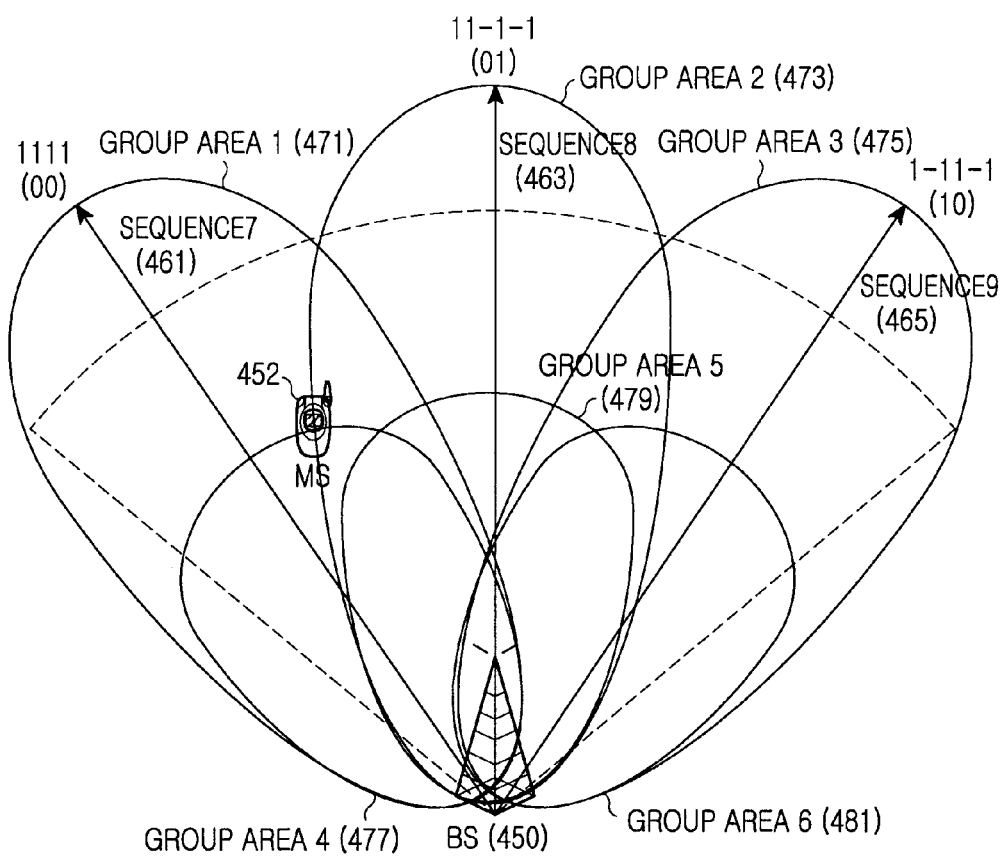
FIG. 4C illustrates an operation of an MS for receiving a MOB_NBR-ADV message by receiving different beams from different directions, for estimating a Round Trip Delay (RTD), and for estimating its location accordingly in a communication system according to an exemplary embodiment of the present invention.

FIG. 4C illustrates an operation of an MS for receiving a MOB_NBR-ADV message by receiving different beams from different directions, estimating an RTD, and estimating its location accordingly in a communication system according to an exemplary embodiment of the present invention.

Referring to FIG. 4C, a BS 450 forms beams corresponding to first/fourth group areas 471/477 (group area 1/group area 4), second/fifth group areas 473/479 (group area 2/group area 5), and third/sixth group areas 475/481 (group area 3/group area 6) and transmits the beams. The beams can be identified by their index messages, for example, 00, 01, and 10.

An MS 452 receives seventh, eighth and ninth sequences 461, 463 and 465 (sequence 7, sequence 8 and sequence 9) and detects the sequence with the highest reception gain. In the example of FIG. 4C, sequence 7 provides the highest reception gain. Sequences 7, 8 and 9 are 1111, 11-1-1, and 1-11-1, respectively. Then the MS 452 estimates an RTD to the BS 450 and compares the RTD with a threshold. Because the RTD is smaller than the threshold, the MS 452 determines that it is located in an inner cell area, i.e. group area 4. Thus, the MS 452 receives a MOB_NBR-ADV message corresponding to group area 4.

Figure 5:
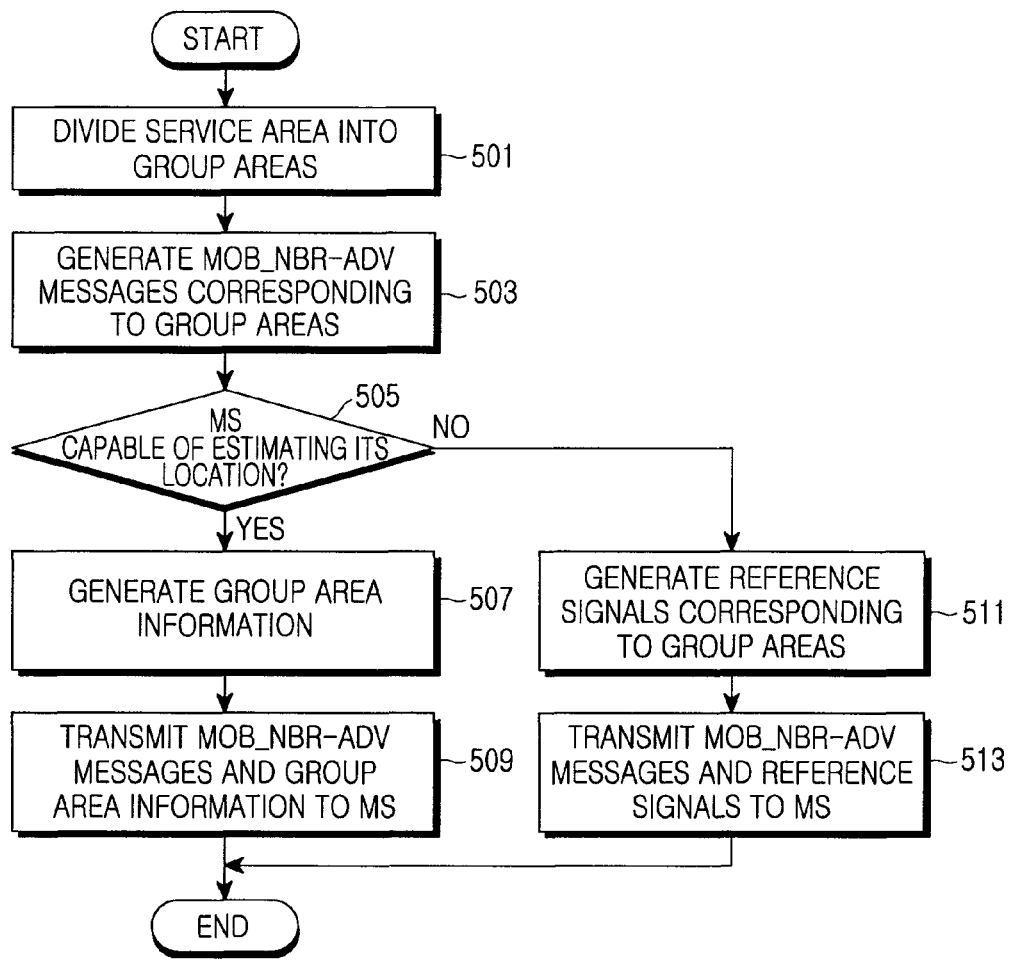
FIG. 5 is a flowchart illustrating an operation of a BS for transmitting MOB_NBR-ADV messages in a communication system according to an exemplary embodiment of the present invention.

FIG. 5 is a flowchart illustrating an operation of a BS for transmitting MOB_NBR-ADV messages in a communication system according to an exemplary embodiment of the present invention.

Referring to FIG. 5, the BS divides its service area into a plurality of group areas in step 501. In step 503, the BS generates MOB_NBR-ADV messages for the respective group areas. In step 505, the BS determines whether an MS can estimate its location. If the MS can estimate its location, the BS creates information about the group areas in step 507. For example, the BS may create information about the coordinates and/or radius of each group area. In step 509, the BS transmits the MOB_NBR-ADV messages and the group area information to the MS.

Alternatively, if it is determined that the MS cannot estimate its location in step 505, the BS generates reference signals specific to the group areas in step 511. For example, the BS may generate beams specific to the group areas. Then, the BS transmits the MOB_NBR-ADV messages and the reference signals to the MS in step 513.

In the exemplary embodiment of FIG. 5, the BS determines if the MS can estimate its location when a change occurs to the system rather than each time it transmits the MOB_NBR-ADV messages. If MSs capable of locating themselves co-exist with MSs that cannot locate themselves, the BS performs steps 511 and 513, or steps 507 to 513 so that MSs receive the MOB_NBR-ADV messages in different manners according to their capabilities.

Figure 6:
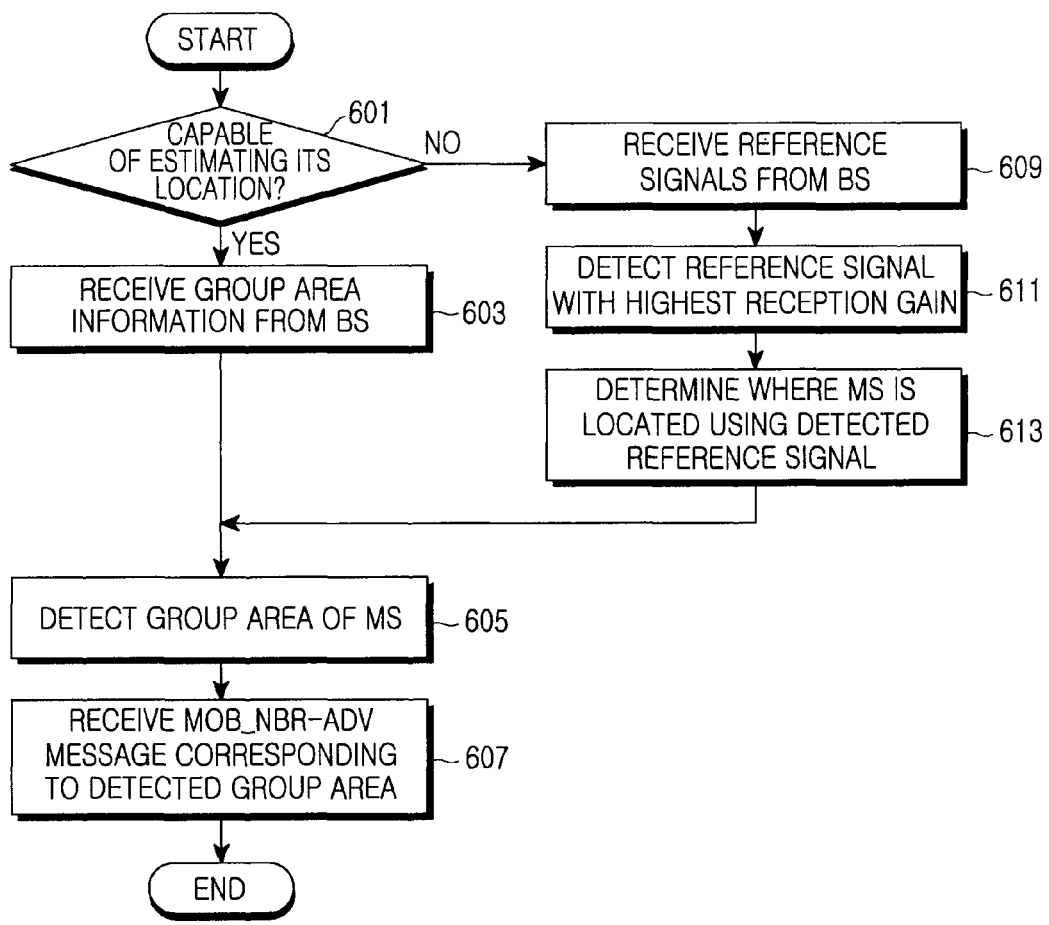
FIG. 6 is a flowchart illustrating an operation of an MS for receiving a MOB_NBR-ADV message in a communication system according to an exemplary embodiment of the present invention.

FIG. 6 is a flowchart illustrating an operation of an MS for receiving a MOB_NBR-ADV message in a communication system according to an exemplary embodiment of the present invention.

Referring to FIG. 6, the MS determines whether it can estimate its location in step 601. If it can estimate its location, the MS receives information about group areas divided by the BS in step 603 and detects a group area to which it belongs according to the group area information in step 605. In step 607, the MS receives a MOB_NBR-ADV message corresponding to its group area.

Alternatively, if the MS determines that it cannot estimate its location in step 601, it receives reference signals corresponding to the group areas in step 609 and detects reference signals with the highest reception gain in step 611. In step 613, the MS determines where it is located using the reference signals. The MS detects a group area to which it belongs according to the determination in step 605 and receives a MOB_NBR-ADV message corresponding to the group area in step 607.

Figure 7:
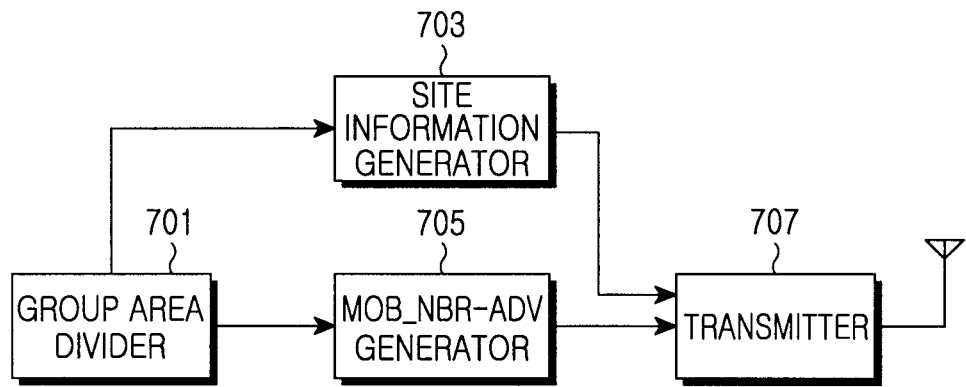
FIG. 7 is a block diagram of a BS for transmitting MOB_NBR-ADV messages in a communication system according to an exemplary embodiment of the present invention.

FIG. 7 is a block diagram of a BS for transmitting MOB_NBR-ADV messages in a communication system according to an exemplary embodiment of the present invention.

Referring to FIG. 7, the BS includes a group area divider 701, a site information generator 703, a MOB_NBR-ADV generator 705, and a transmitter 707.

The group area divider 701 divides the service area of the BS into a plurality of group areas and notifies the MOB_NBR-ADV generator 705 and the site information generator 703 of the group areas. The MOB_NBR-ADV generator 705 generates MOB_NBR-ADV messages corresponding to the group areas and provides them to the transmitter 707. Meanwhile, the site information generator 703 generates site information about the group areas, for example, group area information and reference signals corresponding to the group areas and provides the site information to the transmitter 707.

Figure 8:
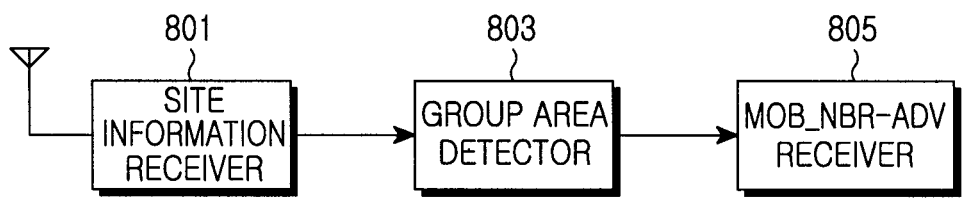
FIG. 8 is a block diagram of an MS for receiving a MOB_NBR-ADV message in a communication system according to an exemplary embodiment of the present invention.

FIG. 8 is a block diagram of an MS for receiving a MOB_NBR-ADV message in a communication system according to an exemplary embodiment of the present invention.

Referring to FIG. 8, the MS includes a site information receiver 801, a group area detector 803, and a MOB_NBR-ADV receiver 805.

The site information receiver 801 receives site information from the BS for detecting the location of the MS. The site information may be group area information or reference signals corresponding to group areas, for example. The group area detector 803 detects a group area to which the MS belongs based on the site information. The MOB_NBR-ADV receiver 805 receives a MOB_NBR-ADV message corresponding to the detected group area.

As is apparent from the above description, exemplary embodiments of the present invention enable a BS to transmit a plurality of MOB_NBR-ADV messages each having information about a small number of neighbor BSs and enables an MS to selectively receive a MOB_NBR-ADV message corresponding to its location in a communication system. Therefore, the transmission overhead of the MOB_NBR-ADV messages is reduced and the power consumption required for scanning neighbor BSs in the MS is minimized.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A handover method of a macro Base Station (BS) in a communication system, the method comprising:
   determining a plurality of group areas by grouping service areas of a plurality of micro BSs in a cell;
   generating a plurality of messages, wherein each of the plurality of messages relates to respective group areas and includes information about at least one micro BS belonging to the respective group areas to which Mobile Stations (MSs) of the respective group areas can perform handover;
   generating group area information indicating locations of the respective group areas or reference signals being used for estimating a location of the respective group areas based on whether a related MS is capable of estimating its location;
   transmitting the plurality of messages and the group area information or the reference signals to the cell; and
   managing handover of the MSs based on the plurality of messages,
   wherein the reference signals are sequences by beamforming in a direction to the respective group areas.

2. The handover method of claim 1, wherein each of the plurality of messages further comprise micro BSs included in a group area and a list including at least one macro BS adjacent to the group area.

3. The handover method of claim 1, wherein the group area information comprises coordinates of a center of each group area.

4. The handover method of claim 3, wherein the group area information further comprises at least one of a radius and a shape of each group area.

5. A handover method of a Mobile Station (MS) in a communication system, the method comprising:
   determining whether the MS is capable of estimating its location;
   receiving a plurality of messages, wherein each of the plurality of messages relates to respective group areas of a cell and receiving group area information indicating locations of the respective group areas or reference signals being used for estimating a location of the respective group areas based on whether the MS is capable of estimating its location from the cell;
   detecting a group area to which the MS belongs based on the received group area information or the reference signals;
   detecting a message related to the detected group area from among the received messages; and
   performing handover based on the detected message,
   wherein the reference signals are sequences by beamforming in a direction to the respective group areas.

6. The handover method of claim 5, wherein the group area information comprises coordinates of a center of each group.

7. The handover method of claim 5, wherein each of the plurality of messages comprises micro BSs included in a group area and a list including at least one macro BS adjacent to the group area.

8. The handover method of claim 6, wherein the group area information further comprises at least one of a radius and a shape of each group area.

9. A macro Base Station (BS) for a handover in a communication system, the macro BS comprising:
   a controller configured to determine a plurality of group areas by grouping service areas of a plurality of micro BSs in a cell, to generate a plurality of messages, wherein each of the plurality of messages relates to respective group areas and includes information about at least one micro BS belonging to the respective group areas to which Mobile Stations (MSs) of the respective group areas can perform handover, to generate group area information indicating locations of the respective group areas or reference signals being used for estimating a location of the respective group areas based on whether a related MS is capable of estimating its location, and to manage handover of the MSs based on the plurality of messages, and
   a transmitter configured to transmit a plurality of messages and the group area information or the reference signals to the cell,
   wherein the reference signals are sequences by beamforming in a direction to the respective group areas.

10. The macro BS of claim 9, further comprising:
    a message generator configured to generate the plurality of messages; and
    a site information generator configured to generate the group area information.

11. The macro BS of claim 9, wherein each of the plurality of messages further comprises micro BSs included in a group area and a list including at least one macro BS adjacent to the group area.

12. The macro BS of claim 9, wherein the group area information comprises coordinates of a center of each group area.

13. The macro BS of claim 12, wherein the group area information further comprises at least one of a radius and a shape of each group area.

14. A Mobile Station (MS) for a handover in a communication system, the MS comprising:
    a receiver configured to receive a plurality of messages, wherein each of the plurality of messages relates to respective group areas of a cell and to receive group area information indicating locations of the respective group areas or reference signals being used for estimating a location of respective group areas based on whether the MS is capable of estimating its location from the cell; and
    a controller configured to determine whether the MS is capable of estimating its location, to detect a group area to which the MS belongs based on the received group area information or the reference signals, to detect a message related to the detected group area from among the received messages, and to perform handover based on the detected message,
    wherein the reference signals are sequences by beamforming in a direction to the respective group areas.

15. The MS of claim 14, further comprising:
a group area detector configured to detect the group area to which the MS belongs based on the group area information and the location information of the MS.

16. The MS of claim 14, wherein the group area information comprises coordinates of a center of each group area.

17. The MS of claim 14, wherein each of the plurality of messages further comprises micro BSs included in a group area and a list including at least one macro BS adjacent to the group area.

18. The MS of claim 16, wherein the group area information further comprises at least one of a radius and a shape of each group area.

* * * * *